United States Patent [19]

Richards

[11] 4,003,585
[45] Jan. 18, 1977

[54] LOGGING TRUCK TRIPPING MECHANISM

[76] Inventor: Gordon B. Richards, Box 1750, Station A, Prince George, British Columbia, Canada

[22] Filed: June 23, 1975

[21] Appl. No.: 589,076

[30] Foreign Application Priority Data

Apr. 7, 1975 Canada .............................. 223981

[52] U.S. Cl. ............................ 280/145; 105/308 P
[51] Int. Cl.² ........................................ B62D 63/08
[58] Field of Search .......... 280/143, 144, 145, 146, 280/147; 254/173 R; 105/300, 308 P, 477

[56] References Cited

UNITED STATES PATENTS

| | | | |
|---|---|---|---|
| 2,546,511 | 3/1951 | Jorgensen | 280/145 |
| 2,559,007 | 7/1951 | Cliffe | 280/145 |
| 2,719,729 | 10/1955 | Henrikson | 280/145 |
| 2,744,766 | 5/1956 | Davidson | 280/145 |
| 2,893,330 | 7/1959 | Johnson | 280/143 |
| 3,100,606 | 8/1963 | Nicholson | 254/173 R |
| 3,549,030 | 12/1970 | Coughran | 280/145 |

Primary Examiner—Philip Goodman
Assistant Examiner—John A. Carroll

[57] ABSTRACT

A device for pulling a trip cable in order to trip a lever with the cable. The device is particularly suited for pulling the trip levers of the bunk stake assemblies of logging trucks. Two of the present devices can be used together to trip both a front and a rear bunk assembly. A spool, which can be mounted on the front end of a loader, is used to store the cable when it is not in use. A large coil spring is used to rotate the spool in order to wind the cable thereon after tripping takes place. A device adjacent the spool is used to grip the cable when one end of the cable is connected to the lever to be tripped. A hydraulic cylinder and piston mechanism is preferably provided for pulling the cable with the gripping means a distance sufficient to trip the lever and disconnect the cable from the lever. After tripping takes place, the spring automatically winds the cable onto the spool.

15 Claims, 9 Drawing Figures

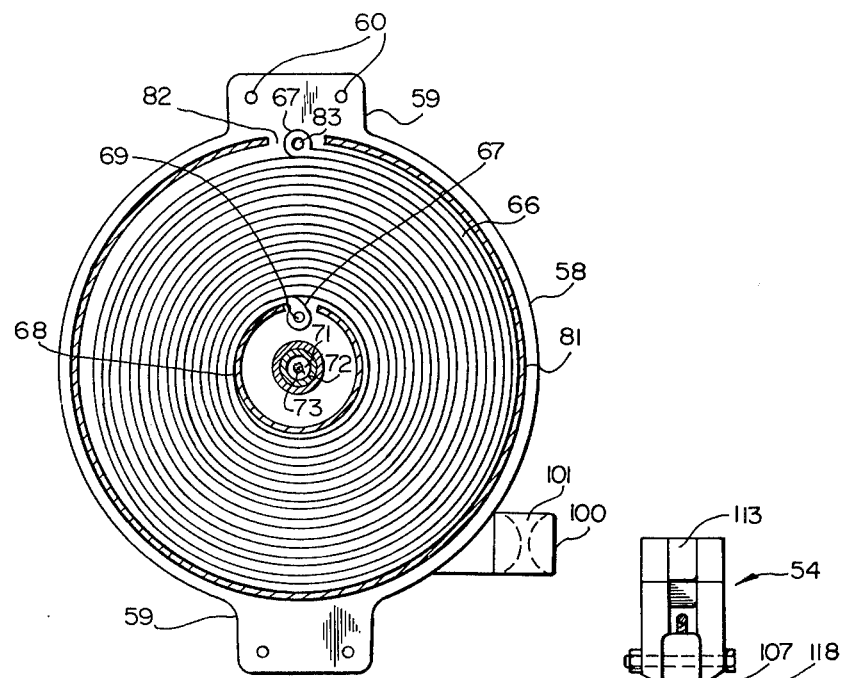
FIG. 7
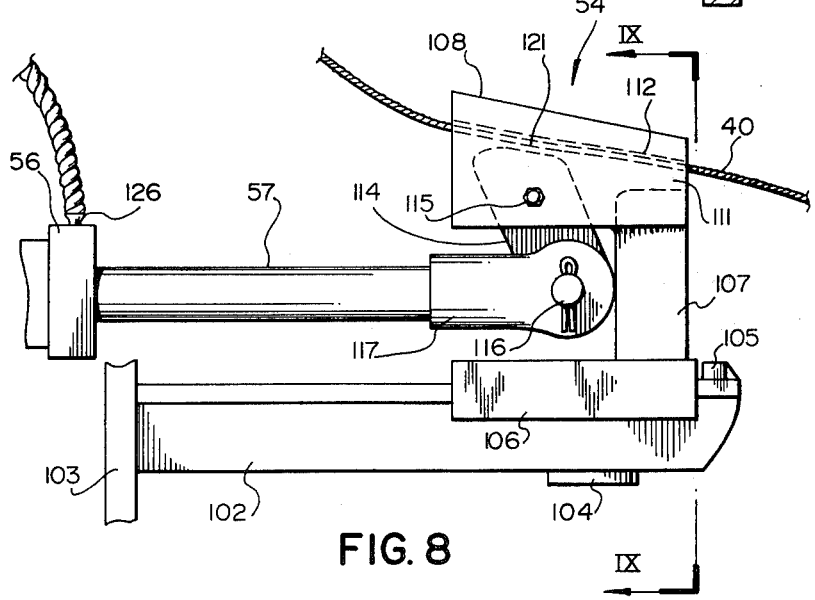
FIG. 9
FIG. 8

LOGGING TRUCK TRIPPING MECHANISM

BACKGROUND OF THE INVENTION

This invention relates to devices for pulling a trip cable in order to trip a lever.

It is well known to employ trip levers for a variety of reasons and particularly on trucks to open doors or tail gates. Trip levers are used also on logging trucks to hold and release the ends of large cables that are wrapped around the outside of the bunk stakes to hold them up. The bunk stakes of course support the load of logs on the sides thereof and during use are arranged in a vertical position. However, when the load is to be dumped, the bunk stakes can be pivoted at their bottom ends and swung outwardly by simply releasing the cables that hold the stakes upright.

Problems have been encountered with the use of such trip levers on logging trucks both because of the great force often required to trip these levers and because of the danger involved for the workman who attempts to trip the levers. Another difficulty arises from the need to trip two of these levers at once in order that an unduly large strain is not placed on a single bunk stake assembly. It will be understood that normally each logging truck has two bunk stake assemblies, one at the front of the load and the other at the rear. Each of these assemblies has its own trip lever and if two men are not available to trip these levers at the same time, then one man, such as the driver of the truck, often attempts to trip both levers. Occasionally an inside stake supporting cable breaks under the tremendous strain of supporting the load on its own causing the logs to be dumped prematurely. Such accidents have sometimes resulted in people being killed, trucks being damaged, or the timber itself being damaged.

A variety of devices have been used in the past in an attempt to trip these levers safely but none have been completely satisfactory for one reason or another. One of these devices is known as a wheel trip which consists of a chain from the truck or tractor wheels to the trip lever. The levers are tripped by driving the loaded truck ahead a few feet. Such devices require considerable time to arrange, are awkward to set up, and are not dependable due to the badly misaligned pull that is exerted on the trip levers by the chains. Moreover sometimes one of the two levers is successfully tripped but the other is not. If it is the rear or trailer bunk stake assembly that is tripped and some of the logs shift so as to hang over the side of the truck, the truck with the operator in it can sometimes be turned over on its side by the weight of the logs. For these reasons wheel trips are seldom used in practice.

Small pneumatic cylinders and co-operating pistons have also been used to trip these levers. These devices are mounted on the inside of the stake bunk assemblies adjacent the trip levers. They have proven to be unreliable either because they cannot exert a sufficient force on the levers, which are sometimes heavily back centered, or they or their hoses freeze-up in winter. They can also be broken by logs hitting them or jammed or seized by mud and dirt in their mechanism.

An object of the invention is to provide a device for pulling a trip cable in order to trip a lever which overcomes many of the above-mentioned problems. The device enables a workman to trip one or more levers from a safe distance or in a location which protects the workman from failing logs. The device is more reliable in that it exerts a sufficient force on the lever to trip it each and every time without fail. The device can also be used quickly and easily and does not require the truck to be moved in order to trip the levers. When two of the devices are used simultaneously, a workman is able to trip both the truck and trailer levers simultaneously.

A further object of the invention is to provide a device for pulling a trip cable which is readily adaptable to present unloading methods. Often a large four wheel loader is employed to safely unload all of the logs from the truck. It will be appreciated that merely releasing the stakes of the two bunk assemblies will not normally cause all of the logs to fall off the truck. Some of the logs will remain on the truck, resting on the horizontal beam support of the tractor and trailer parts of the truck. A large loader is often used to push these remaining logs off the truck and its use helps to ensure that the logs fall off at the desired location. Preferably two of the devices of the invention are mounted on the loading mechanism, which may in the logging industry take the form of a large hydraulic grapple, of the loader and are operated by the loader operator. This operator is of course in a safe position as he is protected by the surrounding loader from any falling logs.

Another advantage of the cable pulling device of the invention is that the long trip cable is rewound quickly on a storage spool after the trip lever is tripped by the cable. Thus the trip cables do not interfere with the operation of the loader after the levers are tripped and are safely stored away for use in unloading the next load of logs. The tedious task of gathering up the trip cable after use is avoided and the trip cable can be located in a most convenient position for subsequent uses.

SUMMARY OF THE INVENTION

Accordingly the device of the invention is for pulling a trip cable in order to trip a lever and comprises spool means for storing said cable in a wound condition, means for winding said cable on said spool means, means for temporarily gripping said cable when one end of said cable is connected to said lever and said cable is being pulled to trip said lever, means for pulling said cable with said gripping means a distance sufficient to trip said lever and disconnect said one end of said cable from said lever, wherein said winding means winds said cable onto said spool means when said one end is disconnected from said lever.

In the preferred embodiment of the invention, the winding means is adapted to rotate the spool means to wind said cable thereon, said winding means is a coil spring, and the means for pulling the cable includes a hydraulic cylinder and piston member. The preferred device disclosed hereinafter has the additional advantages of enabling the trip cable to be gripped and pulled and then rewound onto the spool means automatically after operation of the device is initially triggered by a workman or loader operator. Thus, if a man is operating a loader, he is free to concentrate his efforts on operating the loader without having to operate the various parts of the present device at the same time.

Other features and advantages will become readily apparent from the following detailed description of a preferred embodiment when read in conjunction with the accompanying drawings wherein:

BRIEF DESCRIPTION OF THE DRAWINGS

In the drawings,

FIG. 7 is a sectional view taken along the line VII—VII of FIG. 5 illustrating the arrangement for mounting the spring;

FIG. 8 is a rear elevation showing the device for gripping the cable and a portion of the means for pulling the cable once it has been gripped; and FIG. 9 is a sectional view of the mechanism shown in FIG. 8 taken along line IX—IX of FIG. 8.

DETAILED DESCRIPTION OF PREFERRED EMBODIMENT

Figure 1:
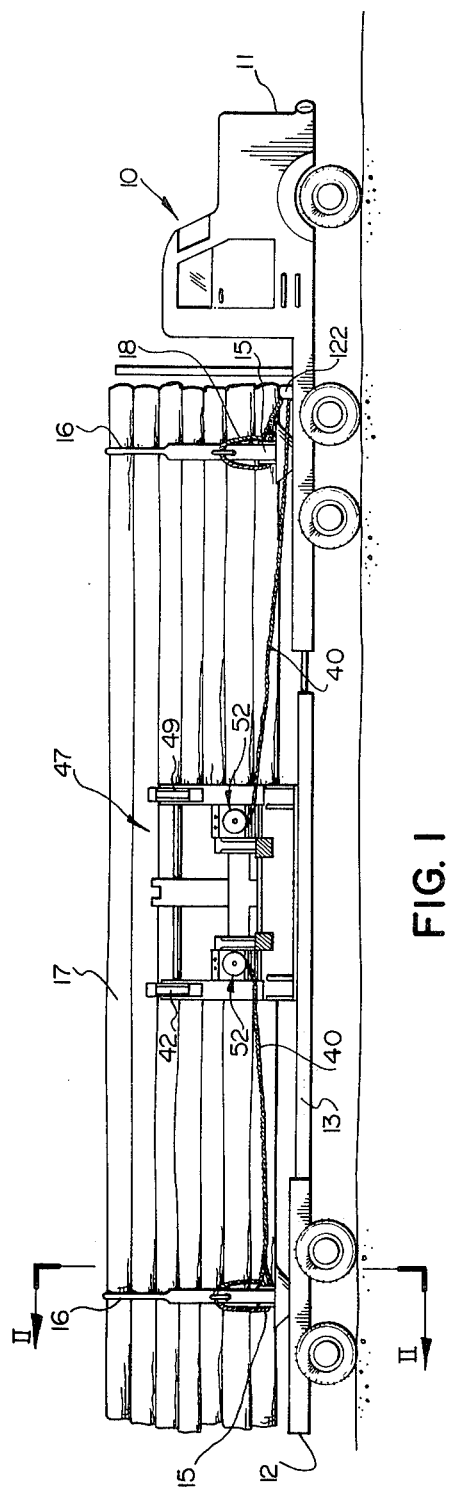
FIG. 1 is a side elevation of a logging truck with a load of logs and shows the front portion only of a loader fitted with a hydraulic grapple, two of the cable pulling devices of the invention being mounted on the grapple.

Referring now to FIG. 1, a logging truck 10 is shown, this truck having a tractor portion 11 at the front and a rear or trailer portion 12 at the back. The truck 10 can either be a truck designed to travel on a highway or other public thoroughfare or only off of highways. The tractor and trailer portions are connected by a long, rigid beam 13. It will be understood that the truck itself is of conventional construction and forms no part of the present invention.

Both the tractor and trailer portions of the truck are provided with a conventional log carrying bunk assembly 15, each assembly having two, normally vertical stakes 16. The two stakes 16 of each assembly are arranged on opposite sides of the load of logs 17. The stakes, which extend substantially the height of the load of logs, prevent the logs from falling off the side of the truck. In order to unload the load of logs from the truck, the two stakes 16 on one side of the load must be swung downwardly out of the way of the logs coming off the side of the truck. Each stake 16 is normally retained in a vertical position by means of a relatively large stake cable 18 which extends around the outside of the stake.

Figure 3:
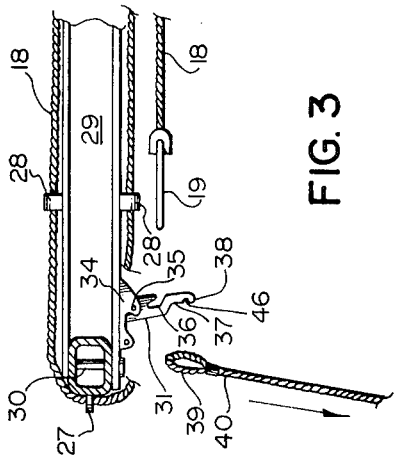
FIG. 3 is a sectional view taken along the line III—III of FIG. 2 but showing the trip lever in the tripped condition.
Figure 2:
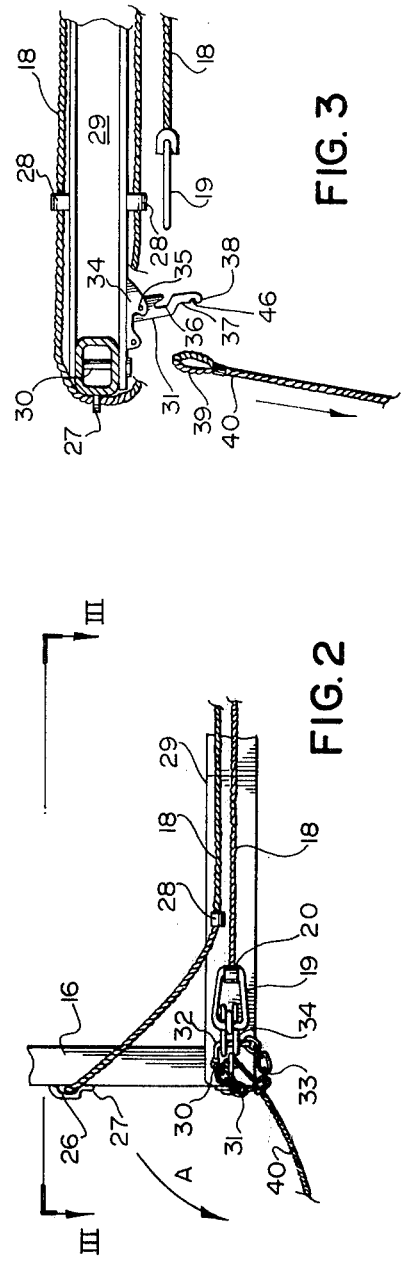
FIG. 2 is an elevational view taken along the line II—II of FIG. 1 and illustrating the upper portion of the rear or trailer logging bunk assembly.

Referring now to FIGS. 2 and 3 of the drawings, it can easily be seen how the stake cables 18 hold their respective stakes 16 in position. The upper cable 18 shown in FIG. 2 is the cable for holding the left hand stake 16 (i.e. the stake that is illustrated) in a vertical position. Only the center portion of this cable is shown in the drawing. The lower cable 18 shown in FIG. 2 is the cable for holding the right hand stake 16 of the bunk assembly in a vertical position. Only the front end portion of this cable is shown in the drawing and this end portion has a rigid loop 19 attached to it. This loop can be constructed from a U-shaped metal bar that is rigidly connected to a cylindrical sleeve 20. Each cable 18 extends through a hole 26 formed by a guide 27 attached to the outer surface of the stake. This guide 27 is located generally from 22 to 26 inches above the bottom end of the respective stake. The stake cables 18 are also maintained in their proper position by guides 28 attached to the front and rear surfaces of the horizontal log supporting beam 29. The bottom end of each stake 16 is pivotally mounted on its respective horizontal beam 29 by means of a large pin 30.

The loop 19 of each stake cable 18 is engaged by a trip lever 31 when the stake is being held in the vertical position. In order to release the stake cable 18 and thereby permit the stake 16 to swing outwardly in the direction indicated by the arrow A, the appropriate lever 31 must be pulled or tripped so that it assumes a position similar to that shown in FIG. 3. Before tripping the lever 31 it is generally necessary to remove a safety lock pin 32 which may be attached to a chain 33, connected to the bunk assembly, so that the pin 32 will not be lost. The trip lever 31 is pivotally mounted on two, horizontally extending plate members 34 by means of a pin or bolt 35. It should be noted that the upper stake cable 18 is pivotally broken away in FIG. 3 in order to illustrate the general shape of the plate members 34 and of the trip lever.

The trip lever has a large recess or slot 36 formed therein for holding the loop 19 of the stake cable. This recess 36 is open at one end to permit the release of the loop 19 when the lever is tripped. The lever 31 also has a handle 37 which is used to trip the lever by pulling the handle away from the adjacent surface of the beam 29. For purposes of the present invention, the handle 37 is preferably formed with a protuberance or knob 38 at its outermost extremity in order to permit the loop 39 of a trip cable 40 to have a good hold on the end of the trip lever. Small notches 46 can also be formed near the outer end of the lever 31 for the same purpose.

In order to trip the lever 31, the trip cable 40 can be attached to the outer end of the lever as illustrated in FIG. 2. By simply exerting a sufficient force on the cable 40, the back-centered lever 31 can be tripped so that it swings to the position shown in FIG. 3, thereby releasing the stake cable 18. The present invention provides a device for pulling a trip cable such as trip cable 40 in order to trip a lever such as trip lever 31. It will of course be understood that when the log bunks are full of logs, the stake cables 18 will normally be submitted to considerable tensile force. This tensile force is transmitted to the trip levers 31 and causes these levers to be pressed against the adjacent beam 29 due to the location of the pin 35 with respect to the loop 19. In other words, the levers 31 are back-centered by the force exerted by the cable 18 and sometimes the levers are back-centered so heavily that considerable force must be used to trip the levers.

Returning to FIG. 1, it will be noted that the front portion 47 of a relatively large loader is shown in the vicinity of the center of the load of logs 17. It will be understood that this front portion 47 is mounted on movable arms at the front end of the loader and that the complete loader has not been shown in the drawings in order to clearly show the general arrangement of the cable pulling devices of the invention. The loader can be of any suitable, well known type and can, for instance, operate on large rubber wheels. In the illustrated embodiment, the front portion 47 of the loader consists of a Weldco (trade mark) grapple, model 32 which is fitted with a movable jaw or clamp 48 shown in FIG. 5. A large hydraulic cylinder and rod assembly 49 is mounted on each side of the front portion 47 and these assemblies provide means for pivoting the clamp 48 about a pivot pin 50. Before using the cable pulling devices of the invention to unload the load of logs, the loader operator closes the hydraulic clamp 48 so that it is in the position shown in FIG. 5 and sets the closed grapple against the side of the load of logs in the manner shown in FIG. 1. The grapple or front portion 47 is preferably fitted with a horizontally extending portion 51. The portion 51 is preferably placed under the load of logs when the grapple is arranged in the position shown in FIG. 1. It will be readily understood that the use of such a grapple during the tripping operation lessens the danger of the load of logs accidentally shifting towards the working area which is the area at the side of the truck that the loader is located on. With the arrangement shown in FIG. 1, it is the intention of the loader operator to dump the load of logs on the far side of the truck. In order to release the stakes 16 on the far side of the truck, it is of course necessary to trip the two trip levers 31 located on the side of the bunk assemblies 15 closest to the loader.

The grapple or front portion 47 shown in FIG. 1 is fitted with two of the trip cable pulling devices 52 of the invention. One of these devices is located on each side of the front portion 47 and is mounted on the rear of the grapple so that each device can be readily seen by the operator of the loader. The devices 52 do not however interfere with the loader operator's view.

Figure 4:
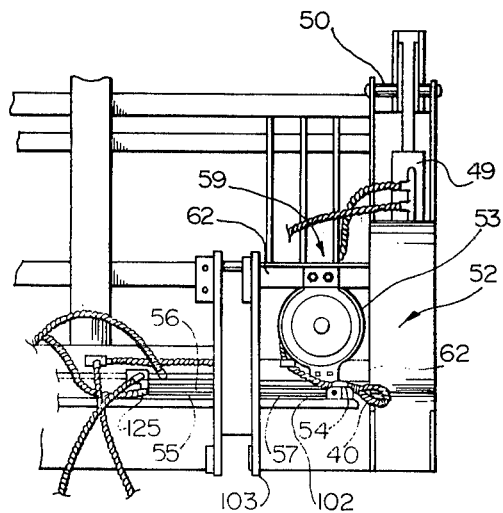
FIG. 4 is a rear elevational view of the right hand side of the hydraulic grapple, the grapple being detached from the loader in order to show clearly the right-hand cable pulling device.
Figure 5:
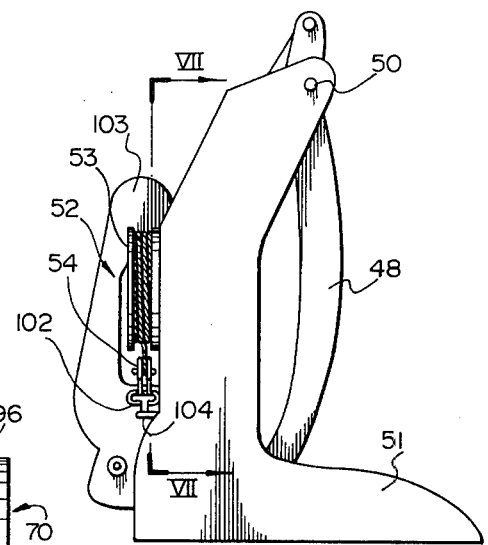
FIG. 5 is a side elevation of the hydraulic grapple shown in FIG. 4.
Figure 6:
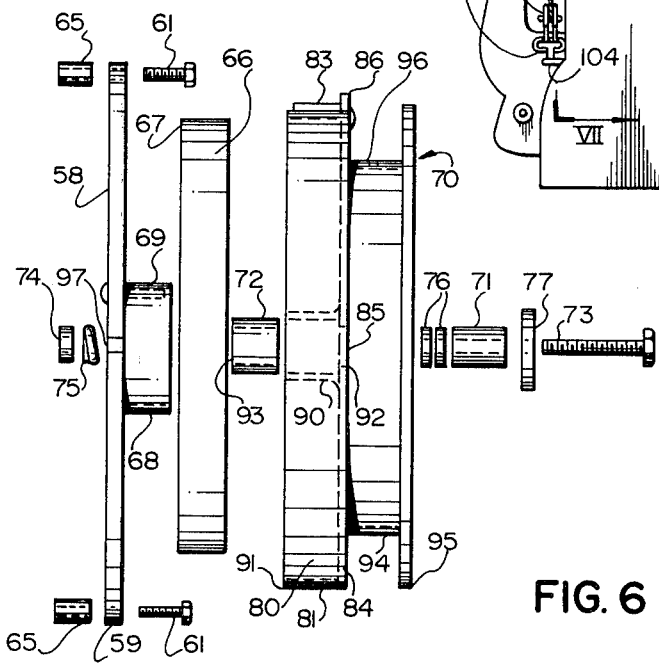
FIG. 6 is a side view showing the various components of the spool means for storing the trip cable and a spring for rotating the spool means, the components being shown in a disassembled state.

Referring now to FIGS. 4 and 5 of the drawings, wherein the right hand side of the grapple is shown along with the right hand cable pulling device 52, there can be seen the spool means 53 of the device which is used to store the cable in a wound position when the trip cable 40 is not being used. The device 52 also includes gripping means 54 for temporarily gripping the cable 40 when one end of this cable is connected to a respective trip lever 31 and the cable is being pulled to trip the lever 31. Pulling means 55 consisting preferably of a hydraulic cylinder 56 and a co-operating rod 57 are also provided for pulling the trip cable 40 with the gripping means 54. The cable is pulled a distance sufficient to trip the respective lever 31 and disconnect the outer end of the cable from the lever.

The spool means 53 is mounted on a generally circular base plate 58 which has extensions 59 extending radially from opposite sides thereof. Each extension 59 has two bolt holes 60 formed therein to receive mounting bolts 61. In order to mount the base plate 58 on two horizontally extending frame members 62 forming part of the grapple or front portion 47, two mounting blocks 65 can be used. These mounting blocks 65, which can have a width and height corresponding approximately to that of the extensions 59, have two threaded holes formed therein to receive the bolts 61. A mounting block 65 is rigidly connected such as by welding to each of the frame members 62 on both the right and left sides of the grapple. Using this form of attachment, the base plate and attached spool means 53 can be removed from the grapple when they are no longer required or when they must be repaired or replaced.

The device 32 of the invention is also provided with winding means for winding the cable on the spool means 53. In the illustrated preferred embodiment, this winding means comprises a coil spring 66 (best seen in FIG. 7) which is adapted to rotate the spool means to wind the cable thereon. The illustrated coil spring consists of a metal band shaped in the form of a spiral, this band having a length of approximately 50 feet. In a particular embodiment of the invention, the spring had a circular space at the center having a diameter of 4 inches and the spring itself was 1¼ inches wide. A retainer loop 67 is preferably formed on the inner and outer ends of the spring. Welded to the center region of the base plate 58 is a support ring 68 on which the coil spring 66 is supported. The ring 68 has a small gap at the top and arranged in the center of this gap is a retainer pin 69. The inner retainer loop 67 of the spring is slid onto this pin 69 so that the inner coil of the spring 66 is effectively prevented from rotating on the ring 68.

The spool means 53 preferably comprises a generally cylindrical trip cable drum and spring chamber member 70, a shaft, 71, a cylindrical bushing 72, a center bolt 73 and a co-operating nut 74. A lock washer 75 is preferably used to maintain the nut 74 on the bolt. Spacer washers 76 can be used as required in order to properly match the length of the shaft 71 with the dimensions of the parts in which the shaft is held. A flange washer 77 can also be placed under the bolt head.

The aforementioned member 70 has a cable drum section for storing the trip cable and an adjacent section which forms a relatively flat, circular chamber 80 that accommodates the coil spring. The chamber 80 is formed by a cylindrical ring 81 having an inner diameter greater than the outer diameter of the coil spring. As can be seen from FIG. 7, the top of ring 81 forms a small gap 82 and in this gap a retainer pin 83 is arranged. The outer retainer loop 67 of the coil spring is slid onto this pin 83 so that the outer end of the spring cannot move with respect to the member 70. Welded to one edge of the ring 81 is a circular plate 84 having a hole 85 in the center thereof large enough to accommodate the shaft 71. A small extension or protuberance 86 having a threaded hole therein extends outwardly from the top edge of plate 84. The pin 83 is mounted on the protuberance 86, extending through the hole therein. Arranged about the center axis of chamber 80 is a cylindrical sleeve 90 which forms a bushing housing. One end of sleeve 90 is rigidly connected to the inner surface of plate 84 such as by welding. The internal diameter of sleeve 90 is approximately equal to the external diameter of bushing 72. The length of bushing 72 is slightly greater than that of sleeve 90 in order that the bushing will extend slightly out of the chamber 80. This arrangement ensures free run clearance between the edge 91 of the spring chamber and the base plate 58. It will be understood that when assembling the spool means and attaching it to the base plate, the bushing is first lubricated by hand packing with grease and then is slid into the sleeve 90 until it bears against the internal flange 92 formed by plate 84. In the assembled state, the protruding end 93 of the bushing rides against the adjacent surface of the base plate and acts as an inner end play bearing surface.

The cable drum portion of member 70 is formed by a further cylindrical ring 94 and an annular flange 95 extending radially outwardly from one end of the ring 94. The flange 95 has an external diameter equal to that of plate 84 and has an internal diameter equal to the internal diameter of ring 94. The drum portion of member 70 is made large enough to accommodate most of the trip cable 40 which can be as long as 30 feet or more and preferably consists of one quarter inch to three-eighths inch steel core cable. It will be obvious to those skilled in the art that one could employ a rope of sufficient strength or a suitable chain rather than a steel cable. It should be understood that the term "cable" as used in the specification is intended to include these possible alternatives. A hole 96 is preferably formed in the side of ring 94 to accommodate the inner end of the cable 40 which projects therethrough. A cable clamp can then be attached to the end of the cable projecting into the interior of ring 94 in order to firmly attach this end of the cable to the member 70.

It should be noted and it can be readily seen upon examining FIG. 7 that the coil spring 66 is reversible in that it can be used to wind the spool means 53 either in a clockwise direction or in a counterclockwise direction, depending upon the specific requirements. In order to reverse the spring, one need only flip the spring onto its other side and attach the ends of the spring to the same retainer pins 69 and 83. To complete the assembly of the spool means, the bolt 73 is put through the washer 77, the shaft 71, the proper number of spacer washers 76, a center hole 97 in the base plate, and the lock washer 75. The nut 74 is then threaded onto the projecting end of the bolt and is tightened as required. There should be sufficient spacer washers to allow the member 70 to run friction free but without appreciable pin play.

In order to guide the trip cable 40 as it winds on or off of the cable drum, a cable guide eye 100 is positioned radially outwardly from the cable drum in the manner shown in FIG. 7. This guide eye 100 is attached by a suitable bracket either to the base plate 58 or directly to the grapple of the loader. Extending through the center of a guide eye is a passageway 101 which is rounded off each end in order to prevent undue wear on the cable and to permit the cable to slide smoothly through the guide eye.

The construction of the cable gripping means 54 can best be seen from FIGS. 8 and 9 of the drawings. A rail member 102 which is T-shaped in cross section is rigidly connected to the frame that forms the grapple or front portion 47. In the embodiment illustrated in FIG. 4, the inner end of the rail 102 is welded to a vertically extending frame member or plate 103. Near the end of the rail closest to the side of the grapple, the bottom edge of the rail is rigidly connected to a horizontal arm or plate 104 which in turn is connected to the grapple. The rail member 102 extends generally horizontally and has a short length of steel bar 105 welded to the top surface of its outer end. The bar 105 acts as a stop which limits the amount of travel of the gripping means 54.

A C-shaped bracket 106 embraces the top, horizontal portion of the rail member 102. The bracket 106 is free to slide on the top portion of the rail member but is prevented from sliding off of the rail member by the bar 105 and by the supporting plate 103. Welded to the top surface of bracket 106 is a vertically extending post 107 and welded to the top portion of this post is an enclosure 108 which is open at the bottom (except in the region of post 107) and at the sides. A passageway 111 is formed between the top end of post 107 and the inner surface 112 of the top of the enclosure. In the illustrated embodiment of the enclosure, the top of passageway 111 is formed by an inner plate member 113 which is sandwiched between the plates forming the sides of the enclosure. Plate member 113 must be sufficiently thick to ensure that the trip cable is able to slide freely between the inner walls of the enclosure. If desired, the inner surface 112 can be arranged at a slight angle to the horizontal so that the trip cable enters and leaves the enclosure without being bent at the ends of the enclosure any more than necessary. Instead of using three separate plate members to form the enclosure 108, it can be formed by simply bending a single plate member so that it has the shape of a U in cross section. The gripping means 54 also includes a pivotable gripping member or dog 114. This dog pivots about a bolt or pin 115 which extends through holes formed in the sides of the enclosure 108. A relatively large pin 116 extends through a hole at the bottom end of dog 114. Extending outwardly from the outer end of the rod 57 of the hydraulic cylinder is a yoke member 117 having two parallel, spaced apart arms 118, each of which has a hole formed therein to receive the connecting pin 116. A small key 119 can be inserted through a hole in the end of pin 116 in order to prevent this pin from working itself out of the holes in the arms 118.

The hydraulic cylinder 56 is mounted to the frame of a grapple so that the rod 57, when fully extended, pushes the gripping means 54 out to the stop bar 105 and the bottom end of the gripping member or dog 114 contacts the side of the post 107 as shown in FIG. 8. As illustrated, in this position, the trip cable 40 is free to slide through the passageway 121 formed between the inner surface 112 and the top end of dog 114. The gripping means is thus brought to this position in order to attach the trip cable to the respective trip lever 31 in the manner indicated in FIGS. 1 and 2.

Thus the right hand trip cable 40 shown in FIG. 1 is pulled from the right hand spool means 53 through the passageways 111 and 121 formed in the respective gripping means 54. This operation is normally done manually by, for instance, the truck operator. Because the front trip lever is located on the front surface of the forward bunk assembly in most cases, the right hand trip cable must normally be wrapped around the outer end of a transversely extending pipe 122. Either a groove can be formed in the outer end of the pipe or an end plate can be fixed to the end of the pipe in order to prevent the trip cable from slipping off of the pipe when the cable is pulled. A pulley could also be used at the pipe 122 for this purpose. As stated previously, a loop 39 is formed on the outer end of the trip cable and this is slipped over the outer end of the handle 37 of the trip lever as indicated in FIG. 2. It will be noted that, at all times, the trip cable remains relatively tense due to the action of the coil spring 66 on the spool means. Thus, no more trip cable is drawn from the spool means than is required and the fastened cable assumes the position shown in FIG. 1. The trip lever of the trailer bunk assembly is also on the front of this assembly and therefore it is not necessary to bend the trip cable 180° as is done with the cable for the front bunk assembly. The left hand trip cable thus extends directly from the left hand gripping means 54 to the rear trip lever as shown in FIG. 1.

When the cables have been placed in position as shown, and the safety lock pins 32 have been pulled by the truck driver, the loader operator from a position inside his cab is able to trip both the front and rear trip levers at once by actuating both the right hand and left hand hydraulic cylinders 56 to retract their rods 57. As can be seen from FIG. 8, initial retraction of the rod 57 into the cylinder will pivot the gripping member or dog 114 causing the dog to firmly grip the trip cable 40 between its top end and the inner surface 112. After the cable has been gripped by the dog the gripping means 54 begins to slide along the rail member 102 due to the further retraction of the rod 57 into the cylinder. This in turn causes the trip cable, which is already relatively taut to be pulled sufficiently to trip the trip lever. It will be understood that the amount of travel of the gripping means 54 on the rail caused by the pulling means 55 is always sufficient to trip the trip lever in the manner shown in FIG. 3.

As can be seen from FIG. 3, the loop 39 in the trip cable disconnects automatically from the trip lever after tripping takes place as the loop simply slides off of the handle 37. It will be realized that an intensive pull is no longer required to reel in the trip cable after the trip lever is tripped. The action of the coil spring on the spool means 53 is sufficient to reel in the trip cable quickly and automatically after tripping occurs. The rewind spring tension on the trip cable causes the dog 114 to pivot back to the position shown in FIG. 8 with the bottom end of the dog resting against the post 107. Alternatively, once the lever has been tripped, the retraction of the rod 57 can be stopped and the motion of the rod reversed so as to cause the dog 114 to move to the position of FIG. 8. After the trip cables have been rewound onto the spool means, the trip cable device of the invention is ready for the next load of logs. After tripping takes place, it will be understood that the loader operator is free to push the load of logs off of the far side of the bunk assemblies by simply moving the front portion 47 in a forward direction.

In one particular embodiment of the invention, the hydraulic cylinder and rod assembly 56 and 57 have a 2½ inch diameter piston with a 10 inch stroke. The cylinder and rod were of the double acting type capable of withstanding a maximum pressure of 4,000 p.s.i. It is of course also possible to use an air cylinder in place of this hydraulic cylinder.

It will be noted that the hydraulic cylinder 56 is readily adaptable to the hydraulic systems of most loaders and can be connected up to the hydraulic system of these loaders in a relatively easy manner. With one particular embodiment of the invention, a hydraulic inlet 125 at the rear end of the cylinder 56 is connected by a hose to the grapple clamp closing line. Similarly, a hydraulic inlet 126 (shown in FIG. 8) at the front end of cylinder 56 is connected to the grapple clamp opening circuit. Forcing hydraulic fluid through inlet 125 causes the rod 57 to move outwards from the cylinder 56 while forcing hydraulic fluid into inlet 126 causes rod 57 to retract. With this arrangement, the trip levers are tripped simply by the loader operator pulling the control lever to open the grapple clamp. This manoeuver causes hydraulic fluid to be fed into inlet 126 which in turn causes the rod 57 to be retracted, tripping the trip lever. Once the trip levers have been tripped and the stakes 16 released, the loader operator simply pushes the logs off of the truck by moving the loader forwardly. The opening movement of the clamp 48 also helps to push the logs off of the truck. Thus, with this particularly advantageous arrangement, only one control lever needs to be operated by the loader operator in order to trip both trip levers and commence the opening of the closed clamp 48.

It will be readily seen from the above description that the trip cable pulling device of the invention has many advantages over the previously known devices, including the ability to trip the trip levers in a dependable and safe manner.

What I claim as my invention is:

1. A device for pulling a trip cable in order to trip a lever, said device comprising spool means for storing said cable in a wound condition, means for winding said cable on said spool means, means for temporarily gripping said cable when one end of said cable is connected to said lever and said cable is being pulled to trip said lever, means for pulling said cable with said gripping means a distance sufficient to trip said lever and disconnect said one end of said cable from said lever, wherein said winding means winds said cable onto said spool means when said one end is disconnected from said lever.

2. A device for pulling a trip cable according to claim 1 wherein said winding means is adapted to rotate said spool means to wind said cable thereon and said winding means includes a coil spring.

3. A device for pulling a trip cable according to claim 1 wherein said pulling means includes a hydraulic cylinder and co-operating rod member.

4. A device for pulling a trip cable according to claim 1, wherein said gripping means includes an enclosure forming a passageway for said cable and a pivotable gripping member having at least a portion thereof defining one side of said passageway, said cable during operation of the device being gripped by pivoting said gripping member and thereby restricting the width of said passageway.

5. A device for pulling a trip cable according to claim 1, wherein initial actuation of said pulling means causes said gripping means to trip said trip cable.

6. A device for pulling a trip cable according to claim 3 wherein initial retracting of said rod member in said cylinder causes said gripping means to grip said trip cable.

7. A device for pulling a trip cable according to claim 6 wherein said gripping means includes an enclosure forming a passageway for said cable and a pivotable gripping member having at least a portion thereof defining one side of said passageway, said cable during operation of the device being gripped by pivoting said gripping member and thereby restricting the width of said passageway.

8. A device for pulling a trip cable according to claim 7 wherein said rod member is connected to said gripping member and said initial retraction of said rod member pivots said gripping member which in turn presses a portion of said cable in said enclosure tightly against an interior surface of said enclosure.

9. A device for pulling a trip cable according to claim 8 wherein said enclosure is slidably mounted on a rail member and retraction of said rod member after said initial retraction causes said enclosure to slide along said rail member.

10. A device for pulling a trip cable according to claim 1 including a trip cable having one end connected to said spool means and a loop formed on the other end.

11. A device for pulling a trip cable according to claim 10 wherein said winding means exerts a cable rewinding force on said spool means at all times, said rewinding force being insufficient to trip said lever.

12. A loader for loading or moving materials comprising a vehicle, a loading device mounted on said vehicle, and a device for pulling a trip cable according to claim 1, said device being mounted on said loading device.

13. A loader for loading or moving materials comprising a vehicle, a loading device mounted on said vehicle, and two devices for pulling trip cables, each cable pulling device being according to claim 1, said cable pulling devices being mounted on opposite sides of a transversely extending, forward portion of said loading device.

14. A device for pulling a trip cable according to claim 2 wherein said spring is enclosed in a relatively flat, circular chamber and is supported on a circular ring located in the centre of said chamber, said chamber being arranged immediately adjacent one end of said spool means.

15. A device for pulling a trip cable according to claim 3, wherein said hydraulic cylinder, rod member and gripping means are located close to one side of said spool means.

* * * * *